US012791691B2

(12) United States Patent
Habeeb et al.

(10) Patent No.: US 12,791,691 B2
(45) Date of Patent: Nov. 10, 2026

(54) SONAR INTEGRATED HEAT SINKING DEVICE AND METHOD

(71) Applicant: Furuno Electric Co., Ltd., Nishinomiya-City (JP)

(72) Inventors: Salah Subhi Habeeb, Auckland (NZ); Matthew Clive Taylor, Auckland (NZ)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 275 days.

(21) Appl. No.: 18/426,338

(22) Filed: Jan. 30, 2024

(65) Prior Publication Data

US 2025/0244456 A1 Jul. 31, 2025

(51) Int. Cl.
*G01S 7/521* (2006.01)

(52) U.S. Cl.
CPC .................................... *G01S 7/521* (2013.01)

(58) Field of Classification Search
CPC .......... G01S 7/521; G01S 7/523; G01S 7/524; G01S 7/526; G01S 7/527; G01S 7/529; G01S 7/53; G01S 7/5273; G01S 7/5276; G01S 7/531; G01S 7/533; G01S 7/534; G01S 7/5345; G01S 7/536; G01S 5/0009; G01S 5/00; G01S 5/16; G01S 5/02; G01S 5/18; G01S 5/01; G01S 5/186; G01S 5/20; G01S 5/22; G01S 5/24; G01S 5/26; G01S 5/28; G01S 5/30; G01S 5/183; G01S 7/54; G01S 7/539; G01S 11/14; G01S 11/16; G01S 15/006; G01S 15/003; G01S 15/00; G01S 15/02; G01S 15/66; G01S 15/74; G01S 15/86; G01S 15/87; G01S 15/874; G01S 15/872; G01S 15/876

See application file for complete search history.

(56) References Cited

U.S. PATENT DOCUMENTS 3,522,480 A * 8/1970 Geren ........................ H03F 1/52 361/58
3,701,089 A * 10/1972 Cowan .................. G01S 7/2806 367/113
4,184,539 A * 1/1980 Rein .................. H05K 7/20445 165/185
4,709,361 A * 11/1987 Dahlstrom ............ B06B 1/0603 367/160
4,964,091 A 10/1990 Cook
(Continued)

FOREIGN PATENT DOCUMENTS

CN 112278182 A * 1/2021 ............. B63B 69/00

*Primary Examiner* — Abdallah Abulaban
*Assistant Examiner* — Amie M Ndure
(74) *Attorney, Agent, or Firm* — XSENSUS LLP

(57) ABSTRACT

A sonar transducer assembly to be used in an underwater environment is disclosed. The sonar transducer assembly includes a housing, a chassis, an ultrasonic transducer, circuitry, and a heat sink. The housing is in contact with the underwater environment. The chassis is within the housing. The ultrasonic transducer is disposed within the housing to transmit an ultrasonic transmission wave to the underwater environment and receive an ultrasonic reflection wave from the underwater environment. The circuitry is disposed within the housing and in communication with the ultrasonic transducer. The heat sink is disposed within the housing and coupled to the circuitry and the chassis to dissipate heat from the circuitry.

17 Claims, 4 Drawing Sheets

(56) References Cited

U.S. PATENT DOCUMENTS

| | | | | |
|---|---|---|---|---|
| 5,213,103 | A | 5/1993 | Martin et al. | |
| 5,497,357 | A * | 3/1996 | Dahlstrom | G10K 9/121 367/165 |
| 5,719,824 | A * | 2/1998 | Boucher | G10K 11/006 310/326 |
| 6,341,661 | B1 * | 1/2002 | Bick | G01S 7/521 181/111 |
| 6,771,564 | B1 * | 8/2004 | Ramotowski | G10K 11/006 367/173 |
| 6,902,446 | B1 * | 6/2005 | Healey | H02K 23/66 318/599 |
| 9,173,035 | B2 | 10/2015 | Button | |
| 9,533,873 | B2 * | 1/2017 | Rothberg | B06B 1/02 |
| 10,369,966 | B1 * | 8/2019 | Higgins | G07C 9/00571 |
| 11,642,105 | B2 | 5/2023 | Zhou et al. | |
| 2009/0235870 | A1 * | 9/2009 | Troy | A01K 61/10 119/51.01 |
| 2009/0323286 | A1 * | 12/2009 | Han | G06F 1/20 361/702 |
| 2011/0267834 | A1 * | 11/2011 | Potucek | F21V 29/70 362/267 |
| 2012/0206050 | A1 * | 8/2012 | Spero | F21S 4/28 315/152 |
| 2013/0182442 | A1 * | 7/2013 | Potucek | F21V 29/74 362/294 |
| 2014/0219062 | A1 * | 8/2014 | Rothberg | B06B 1/02 367/135 |
| 2014/0355381 | A1 * | 12/2014 | Lal | G06N 3/04 327/356 |
| 2015/0035437 | A1 * | 2/2015 | Panopoulos | B60L 53/12 315/291 |
| 2015/0136012 | A1 * | 5/2015 | Williams | B25J 9/08 901/1 |
| 2019/0106190 | A1 * | 4/2019 | Schibli | B63H 20/007 |
| 2020/0137928 | A1 * | 4/2020 | Lu | G01C 21/28 |
| 2020/0378244 | A1 * | 12/2020 | Cooley | E21B 47/13 |
| 2021/0093296 | A1 * | 4/2021 | Zhou | A61B 8/546 |
| 2021/0105914 | A1 * | 4/2021 | Bardsley | H05K 7/20454 |
| 2021/0162912 | A1 * | 6/2021 | Spero | F21S 41/153 |
| 2022/0306152 | A1 * | 9/2022 | Zhang | B60W 60/0017 |
| 2022/0333745 | A1 * | 10/2022 | Goutain | G02B 6/0008 |

* cited by examiner

SONAR INTEGRATED HEAT SINKING DEVICE AND METHOD

TECHNICAL FIELD

The present disclosure relates generally to a sonar system and, more particularly, to a sonar transducer assembly integrated with a heat sink.

BACKGROUND

Sonar systems are widely utilized for various applications, including underwater exploration, navigation, and target detection. The sonar systems often generate vast amounts of data, which must be processed and displayed efficiently to extract insightful information. A sonar system includes a sonar transducer assembly that has electronic circuitry to perform operations associated with the sonar transducer assembly. The electronic circuitry produces considerable thermal energy due to high processing loads, high power transmission, and complex receiver networks. Galvanic corrosion and oxidization pose a challenge for mounting of metal components on ships where metallic surfaces are exposed to the sea water, as seawater is a conductive and corrosive medium.

Traditional systems mount sonar electronics in boxes near the transducer, but several modern systems mount the electronics in the sonar head (i.e., the transducer assembly). To dissipate the heat from a small waterproof enclosure is a challenge. An approach is to utilize a direct connection to a metal heat sink that has contact with the water, which allows powerful heat dissipation capability. However, the above mentioned heat sinking technique requires exposure to the sonar and other metals on the ship to the above mentioned corrosive environment of sea water.

In light of the foregoing, there is a need for providing a technical solution that overcomes the challenges and shortcomings of conventional sonar systems for heat sinking.

SUMMARY

In an embodiment of the present disclosure, there is provided a sonar transducer assembly to be used in an underwater environment. The sonar transducer assembly includes a housing, a chassis, an ultrasonic transducer, circuitry, and a heat sink. The housing is in contact with the underwater environment. The chassis is within the housing. The ultrasonic transducer is disposed within the housing to transmit an ultrasonic transmission wave to the underwater environment and receive an ultrasonic reflection wave from the underwater environment. The circuitry is disposed within the housing and in communication with the ultrasonic transducer. The heat sink is disposed within the housing and coupled to the circuitry and the chassis to dissipate heat from the circuitry.

Additionally, or optionally, the housing may be molded on an outer surface of the chassis by one of: overmolding and insert molding.

The sonar transducer assembly allows heat dissipation in a robust way without any metallic parts being exposed to the corrosive environment. The metal (i.e., chassis) in the sonar transducer assembly may also be used to reinforce a structural strength of the transducer assembly.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION OF THE EMBODIMENTS

Figure 1:
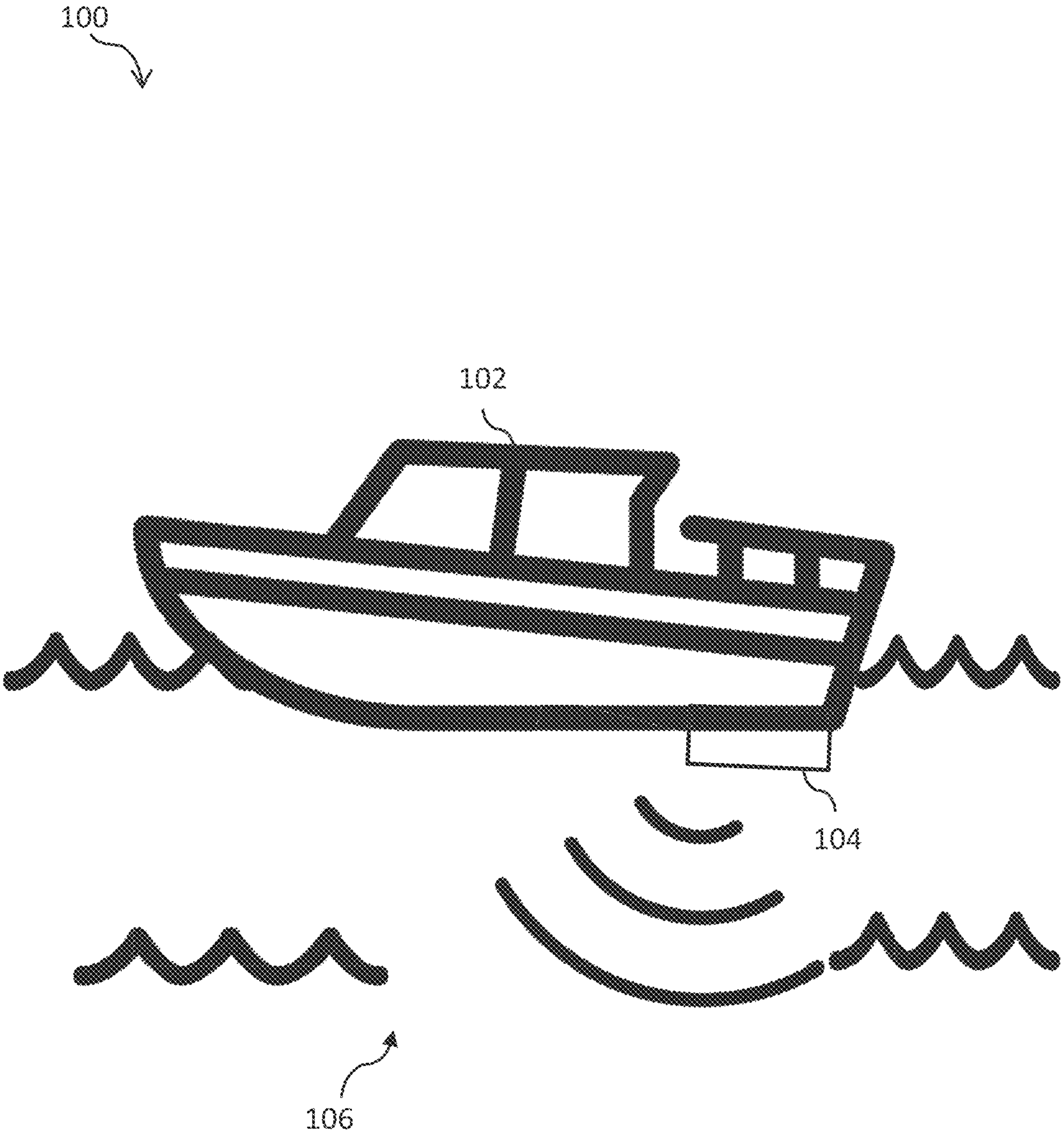
FIG. 1 illustrates a system environment of a sonar transducer assembly, in accordance with an exemplary embodiment of the disclosure.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

FIG. 1 illustrates a system environment 100 of a sonar transducer assembly, in accordance with an exemplary embodiment of the disclosure. The system environment 100 includes a ship 102, a sonar transducer assembly 104, and an underwater environment 106. In an example embodiment, the sonar transducer assembly 104 is installed on the ship 102 navigating over the underwater environment 106. The underwater environment 106 may comprise a sea, an ocean, a river, or the like. In an example embodiment, the sonar transducer assembly 104 is deployed to detect and identify underwater targets, such as fish, fish schools, submarines and mines. In general, the sonar transducer assembly 104 is configured to detect and determine distance and direction of the underwater targets with respect to the sonar transducer assembly 104 by use of acoustic means. For example, sound waves are emitted by the sonar transducer assembly 104 and reflected sound waves from the underwater targets are detected and analyzed by the sonar transducer assembly 104. In an exemplary embodiment, the sound waves may be ultrasonic waves.

The sonar transducer assembly 104 is configured to transmit the ultrasonic waves in the underwater environment 106. The sonar transducer assembly 104 is further configured to receive reflected ultrasonic waves from one or more underwater targets in the underwater environment 106 and generate a reception signal based on the reflected ultrasonic waves. A detailed analysis of the sonar transducer assembly 104 is described below with respect to FIGS. 2-4.

Figure 2:
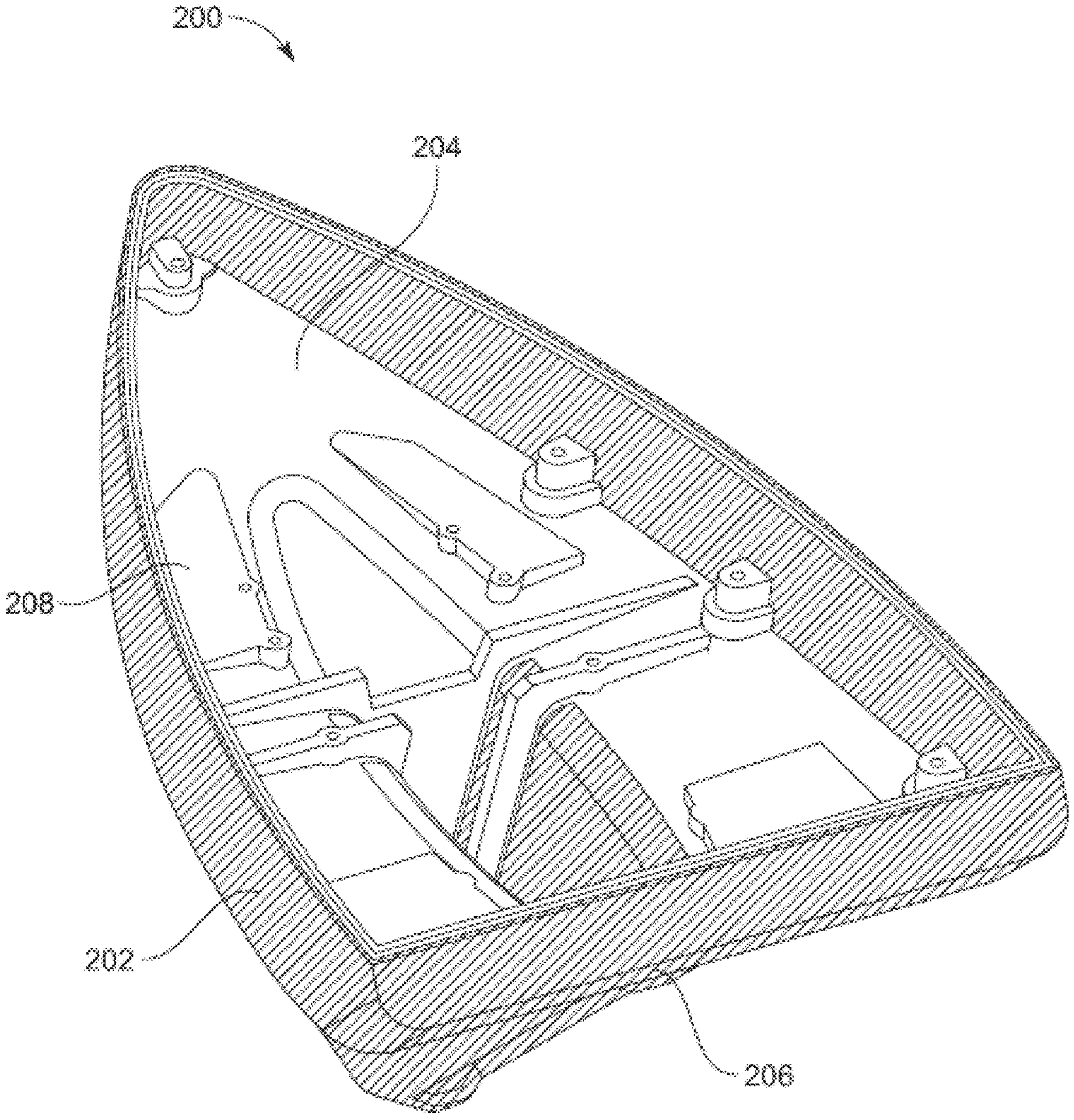
FIG. 2 illustrates a housing, a chassis, and an ultrasonic transducer of the sonar transducer assembly of FIG. 1, with an exemplary embodiment of the disclosure.

FIG. 2 illustrates a housing 202, a chassis 204, and an ultrasonic transducer 206 of the sonar transducer assembly 104, with an exemplary embodiment of the disclosure. The chassis 204 in association with the housing 202 provide a structure to contain the ultrasonic transducer 206 and other parts (e.g., electronic components) associated to the ultrasonic transducer 206 as further described below. The chassis 204 in association with the housing 202 also provide rigidity to overcome external forces from the underwater environment 106 when the ship 102 navigates over the underwater environment 106. Moreover, the chassis 204 in association with the housing 202 provide a heat sinking function. The housing 202 may be a layer on an outer surface of the chassis 204. The housing 202 may be sandwiched between the chassis 204 and the underwater environment 106. In one embodiment, the housing 202 is a thin plastic wall with a narrow thickness. In one example, the narrow thickness is less than two millimeters. The thickness of the housing 202 is configured based on molding limitations, desired durability, and required thermal resistance. The housing 202 may be molded on the outer surface of the chassis 204 by one of: overmolding technique and insert molding technique. The overmolding technique and insert molding technique are types of injection molding.

Injection molding is a process by which a polymer is melted and injected into a mold cavity void. The mold used to create a final product is an inverse shape of the desired final product. Molds are typically made of hardened steel or aluminum. Once the melted plastic is injected into the mold, the melted plastic cool down to a shape that reflects the form of the cavity. The injection molding machine may have two basic components: an injection unit to melt and transfer the plastic into the mold and a clamp to hold the mold against injection pressures and for parts removal.

The overmolding technique is a multi-step injection molding process where two or more components are molded over top of one another. Initially, a base component is molded and allowed to cure. Further, a second layer is molded on top of the first to create a single piece. Insert molding is another form of injection molding by which a molten thermosetting plastic or rubber is injected onto an existing article (for example, the chassis 204) placed within an injection mold to add one or more additional layers or shape or structure (for example, the housing 202) to the existing article. The process may in particular be used to permanently join existing articles together. Overmolding and insert molding may be used with a wide range of materials, including but not limited to ABS (acrylonitrile butadiene styrene), HDPE (high-density polyethylene), PEEK (polyether ether ketone), nylon (polyamide), PC (polycarbonate), PE (polyethylene), PEI (polyetherimide), PBTR (polybutylene terephthalate), PMMA (poly methyl methacrylate), POM (polyoxymethylene), PP (polypropylene), SI (silicone), TPE (thermoplastic elastomers), TPU (thermoplastic polyurethane), and TPR (thermoplastic rubber).

It will be apparent to a person skilled in the art that although in the current embodiment, the housing 202 may be molded on the outer surface of the chassis 204 by one of: the overmolding technique and the insert molding technique, the scope of the present disclosure is not limited to it. In various other embodiments, the housing 202 may be molded on the outer surface of the chassis 204 by any suitable molding technique, without deviating from the scope of the present disclosure.

It will be understood by a person skilled in the art that different types of methods may be used for fabrication of the housing 202 which include, but are not limited to, dipping a metal shell (i.e., chassis 204) in a bath of plastic, an injection molding of plastic about a metal shell (i.e., chassis 204), and a low pressure molding using polyurethane. In an embodiment, the injection molding technique corresponds to using a low pressure molding technique using polyurethane, where the metal shell (i.e., chassis 204) is placed in a mold and the polyurethane is poured into the mold around the metal shell. The chassis 204 may have one or more holes connecting an inside surface of the chassis 204 and an outside surface of the chassis 204 opposite to the inside surface. When pouring the polyurethane into the mold, the polyurethane flows through the one or more holes, and, as a result, the polyurethane is in contact with both the inside surface of the chassis 204 and the outside surface of the chassis 204. The polyurethane may further be configured to encapsulate an internal space in an enclosure including the space around a heat sink, the ultrasonic transducer 206, and circuitry (shown later in FIG. 3).

As a result of the injection molding techniques described above, the chassis 204 is coupled to the housing 202 in a seamless connection, i.e., the connection between the chassis 204 and the housing 202 is smooth, continuous, and without gaps between the chassis 204 and the housing 202. In one embodiment, the chassis 204 follows the same surface as the housing 202. The housing 202 has a substantial surface area close to the outside surface of the chassis 204 for the purpose of heat sinking. In one embodiment, the chassis 204 may be made of metallic material. In one example, the chassis 204 may be made of aluminum. In another example, the chassis 204 may be made of any suitable material, without deviating from the scope of the present disclosure.

The ultrasonic transducer 206 is disposed within the housing 202. The ultrasonic transducer 206 may be configured to transmit an ultrasonic transmission wave to the underwater environment 106 and receive an ultrasonic reflection wave from the underwater environment 106. The ultrasonic transducer 206 may be further configured to convert sound energy into electrical energy at a particular frequency or in a particular frequency band. The ultrasonic transducer 206 uses the ultrasonic waves with frequency generally exceeding 20 kHZ. The ultrasonic waves are transmitted into and through the underwater environment 106 and are reflected from underwater targets the ultrasonic wave encounters. The ultrasonic transducer 206 may receive the reflected sound and convert the sound energy into electrical energy. Based on the known speed of sound, the distance of the underwater targets from the ultrasonic transducer 206 is determined. Reflected signals may also be processed to be displayed in graphical form on a display device, to provide a picture of the underwater environment 106 to a user.

Figure 3:
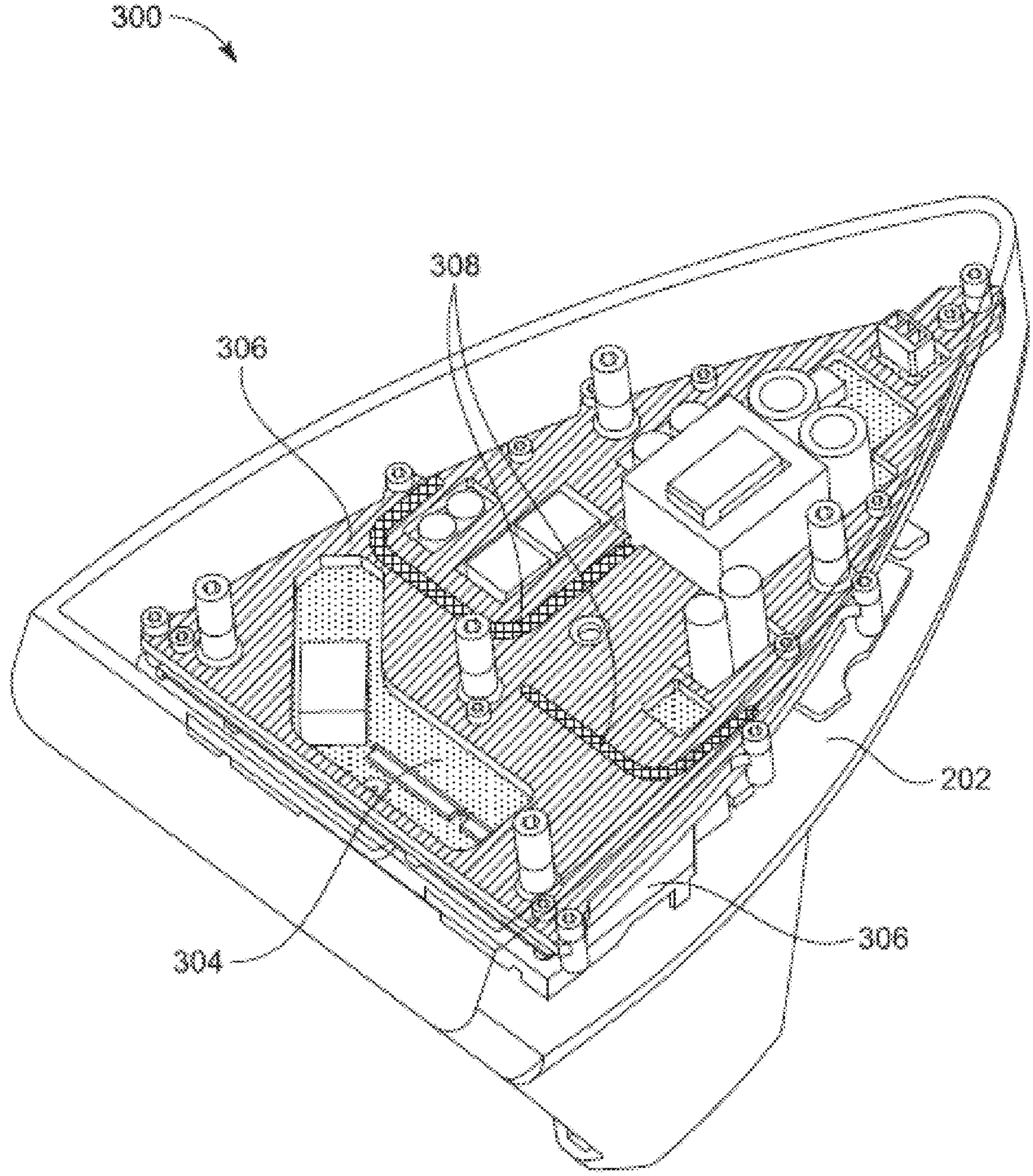
FIG. 3 illustrates circuitry and a heat sink of the sonar transducer assembly of FIG. 1, with an exemplary embodiment of the disclosure.

FIG. 3 illustrates a circuitry 304 and a heat sink of the sonar transducer assembly 104, with an exemplary embodiment of the disclosure. The circuitry 304 is disposed within the housing 202 and coupled to the ultrasonic transducer 206. The circuitry 304 is configured to communicate with the ultrasonic transducer 206. The circuitry 304 includes electronic components and processing circuitry that help the ultrasonic transducer 206 to transmit, receive, and process the signals. The circuitry 304 may include the electronic components that generate heat, which include, but are not limited to, microprocessors, integrated chips (ICs), and transmit chips used for transmission of the ultrasonic transmission wave. To ease the understanding of FIG. 3, the chassis 204 in association with the housing 202 is intentionally transparent in FIG. 3.

The heat sink is configured to facilitate fast effective routing of heat inside the sonar transducer assembly 104. The heat sink is disposed within the housing and coupled to the circuitry 304 and the chassis 204 to dissipate heat from the circuitry 304. The heat sink may include one or more metallic heat spreaders 306 and one or more heat pipes 308. The heat sink may include two metallic heat spreaders 306, a top heat spreader that may be placed above the circuitry 304 and a bottom heat spreader that may be placed below the circuitry 304 to absorb the heat generated by the circuitry 304. Each heat spreader may include heat pipe assembly. The metallic heat spreader 306 may be placed in proximity to a surface of the circuitry 304. In one example, the metallic heat spreader 306 may be made of nickel plated aluminum. In one embodiment, the metallic heat spreader 306 may be made with the heat pipe 308 pre-soldered.

One or more of the electronic components of the circuitry 304 are heat generating components. According to an embodiment of the present disclosure, the metallic heat spreader 306 may include the top heat spreader located above and in thermal contact with the heat generating components of the circuitry 304, the bottom heat spreader located below and in thermal contact with the heat-generating components of the circuitry 304, and heat pads 208 located on the chassis 204 and in thermal contact with one of the bottom heat spreader and the top heat spreader, or the heat-generating component. For dissipation of heat, heat dissipation paths for the heat generating components may include a path through a top surface of the heat generating component to the top heat spreader and a path through a bottom surface of the heat generating component to the bottom heat spreader. The heat pads 208 may be metal pads integrally formed on the chassis 204. In one example, the heat pads may take the form of a copper or other metal pad that is integrally formed with the chassis 204.

The heat generating components of the circuitry 304 may generate heat during normal operation of the sonar transducer assembly 104. The metal heat spreader 306 then directs heat that comes from the heat generating components of the circuitry 304 away from the remainder of the circuitry 304. These metallic heat spreaders 306 can be located above and/or below the heat generating components. In some simple embodiments the metallic heat spreader may be incorporated entirely into the chassis 204.

The top heat spreader may generally define a larger or the same overall area than the area defined by the circuitry 304, and may be designed to overlap all or most of the circuitry 304. The top heat spreader may include various top coupling features to allow coupling to other electronic components of the circuitry 304 and the bottom heat spreader, among other possible components.

The bottom heat spreader may be similar to top heat spreader in a variety of ways. The bottom heat spreader may also define a larger or the same overall area than the area defined by the circuitry 304, and may be designed to overlap all or most of the circuitry 304. The bottom heat spreader may include various bottom coupling features that allow coupling to other electronic components of the circuitry 304 and the top heat spreader, among other possible components.

The metallic heat spreader 306 may include a groove in which the heat pipe 308 is soldered. The groove is positioned so that the heat pipe 308 runs in proximity to electronic components that generate the most heat, such as high power central processing unit (CPU) modules. The heat pipe 308, which is a device with a working fluid therein, uses thermal conductivity and phase change to transfer heat in a cycle between opposite ends of the heat pipe. In one example, the heat pipe 308 may be made up of copper, water with sintered wick. The heat pipe 308 may include a wicking material around inner edges of a casing. In a cycling internal process within the heat pipe, the working fluid flows in liquid form along the wicking material by means of capillary forces, from a cold end of the heat pipe 308, which acts as a condenser, to a hot end of the heat pipe 308, which acts as an evaporator. At the hot end the working fluid is heated, by way of the heat generated by the heat generating components, to become gaseous vapor. The working fluid as a gas flow from the heat pipe's hot end to the heat pipe's cold end, along a central cavity or core that is free of the wicking material due to the higher vapor pressure in the evaporator versus the lower vapor pressure in the condenser. At the cold end, the gaseous working material cools and condenses again at the wicking material, starting the flow cycle over again. The heat pipes 308 may have, for example, an effective thermal conductivity of from 10,000 W/m/K to 40,000 W/m/K.

Figure 4:
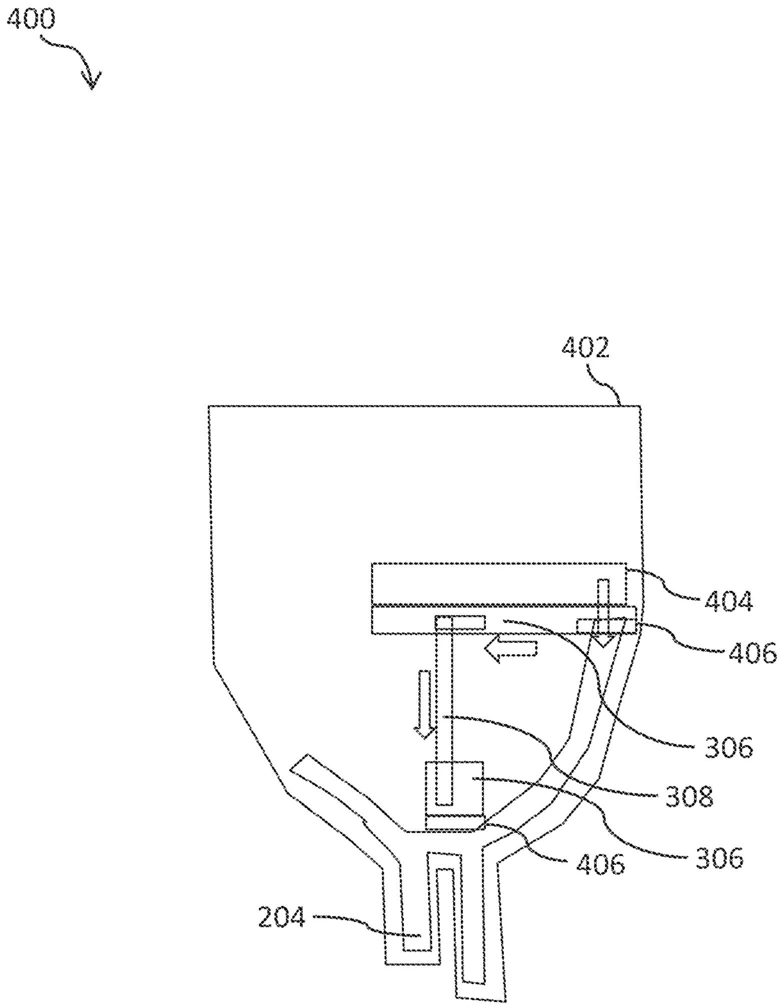
FIG. 4 illustrates a configuration of the heat sink of the sonar transducer assembly of FIG. 1, with an exemplary embodiment of the disclosure.

FIG. 4 illustrates a configuration of the heat sink of the sonar transducer assembly 104, with an exemplary embodiment of the disclosure. The transducer assembly 104 includes the housing 402, a heat source 404, the metallic heat spreader 306, the heat pipe 308, a set of attachments 406 (i.e., the heat pads 208), and the metal chassis 204. The heat source 404 may be one or more electronic components (i.e., heat generating components) of the circuitry 304 that generates heat during the operation of the sonar transducer assembly. The heat source 404 may be high power CPU module. As illustrated by arrows in FIG. 4, the heat generated by the heat source 404 may flow from first end (i.e., hot end) of the heat pipe 308 to the second end (i.e., cold end) of the heat pipe which is placed in proximity to the heat source 404. The heat pipe 308 may further transfer the heat to the chassis 204 through a set of attachments 406 to dissipate the heat. The heat generated by the heat source 404 may be absorbed by metallic heat spreader 306. The metallic heat spreader 306 further transfers the heat to the chassis 204 through the set of attachments 406 to dissipate the heat.

The disclosure allows heat dissipation in a robust way without any metallic parts being exposed to the corrosive environment. The heat sink also may act as an electromagnetic shield which due to the plastic encapsulation is able to be isolated from the ocean to prevent unintentional ground loops. The metal (i.e., chassis 204) in the transducer assembly 104 may also be used to reinforce the structural strength of the transducer assembly 104.

Although the embodiments of the present disclosure have been described above, the present disclosure is not limited to the embodiments described above, and various modifications can be made by those skilled in the art.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A sonar transducer assembly, comprising:

a housing mounted to a bottom of a surface ship, the housing having a bottom and sidewalls that, when mounted to the bottom of the surface ship, forms a waterproof compartment that is in contact with an underwater environment;

a chassis coupled to at least an inner bottom surface of the housing;

an ultrasonic transducer disposed within the waterproof compartment and configured to transmit an ultrasonic transmission wave to the underwater environment and receive an ultrasonic reflection wave from the underwater environment;

circuitry disposed within the waterproof compartment and in communication with the ultrasonic transducer; and a heat sink disposed within the waterproof compartment and coupled to the circuitry and the chassis, the heat sink configured to dissipate heat from the circuitry.

2. The sonar transducer assembly of claim 1, wherein the chassis is coupled to the inner bottom surface of the housing in a seamless connection.

3. The sonar transducer assembly of claim 1, wherein the housing is a layer on an outer surface of at least a part of the chassis.

4. The sonar transducer assembly of claim 1, wherein at least a part of the housing is sandwiched between the chassis and the underwater environment.

5. The sonar transducer assembly of claim 1, wherein the housing is molded on an outer surface of the chassis.

6. The sonar transducer assembly of claim 5, wherein the housing is molded on the outer surface of the chassis by one of: overmolding or insert molding.

7. The sonar transducer assembly of claim 1, wherein:

the heat sink comprises a metallic heat spreader placed a predetermined distance from a surface of the circuitry; and the metallic heat spreader comprises a groove and a heat pipe disposed within the groove.

8. The sonar transducer assembly of claim 7, wherein at least a first portion of the heat pipe runs along a horizontal plane a predetermined distance from one or more electronic components of the circuitry that radiate heat.

9. The sonar transducer assembly of claim 1, wherein the chassis is made of a metallic material.

10. The sonar transducer assembly of claim 1, wherein the chassis is made of aluminum.

11. The sonar transducer assembly of claim 1, wherein the housing is made of a plastic material.

12. The sonar transducer assembly of claim 1, wherein the housing is made of polyurethane.

13. The sonar transducer assembly of claim 12, wherein:

the chassis comprises one or more holes connecting an inside surface of the chassis and an outside surface of the chassis opposite the inside surface; and the polyurethane is in contact with both the inside surface of the chassis and the outside surface of the chassis, and the polyurethane fills the one or more holes connecting the inside and outside surfaces.

14. The sonar transducer assembly of claim 13, wherein the polyurethane further covers the circuitry and the heat sink.

15. The sonar transducer assembly of claim 1, wherein in a plan view, the housing has a substantially triangular shape having a centerline that is aligned with or parallel to a centerline of the ship, with an apex of the substantially triangular shape aligned with a rear direction of the ship.

16. The sonar transducer assembly of claim 7, wherein the metallic heat spreader comprises an upper metallic heat spreader in thermal contact with a first side of the circuitry and a lower metallic heat spreader in thermal contact with a second side of the circuitry opposite from the first side of the circuitry.

17. The sonar transducer assembly of claim 16, wherein:

the waterproof compartment includes a cavity extending substantially vertically forming a lower fin of the sonar transducer assembly, and in the lower fin, the heat pipe includes a portion that runs in a vertical direction perpendicular to the lower metallic heat spreader, the lower metallic heat spreader connected to a heat pad.

* * * * *